United States Patent Office 3,458,328
Patented July 29, 1969

3,458,328
AQUEOUS MULTICOLOR COATING COMPOSITIONS AND PREPARATION THEREOF
John C. Zola, 2662 S. 10th Ave.,
Arcadia, Calif. 91006
No Drawing. Continuation-in-part of application Ser. No. 104,211, Apr. 20, 1961. This application Jan. 17, 1967, Ser. No. 609,769
Int. Cl. C09d 5/00
U.S. Cl. 106—15                 22 Claims

ABSTRACT OF THE DISCLOSURE

Aqueous multicolor coating compositions of two or more phases consisting of at least one dispersed phase consisting of discrete globules or droplets of an aqueous film-former and containing therein a hydrophilic colloid, which dispersed phase is dispersed in an aqueous dispersing medium. At least some of the dispersed globules are different in color from the dispersing medium and a substantial number of said globules are at least about 25 microns in size.

---

The film-former in said globules may be a hydrophilic colloid. On the other hand, it may be a ceramic frit or other material dispersible in water, but which by itself or with the hydrophilic colloid will form a film when the composition is applied to a surface.

The discrete globules may be rendered immiscible or insoluble in the aqueous dispersing medium by the action of an insolubilizing agent on the hydrophilic colloid present to form semi-fluid to gelatinous globules.

This application is a continuation-in-part of my copending application, Ser. No. 104,211, filed Apr. 20, 1961, now abandoned.

This invention relates to coating compositions and methods for preparing such compositions. More particularly, the invention relates to coating compositions of dispersed discrete aqueous globules or droplets of coating material in an aqueous dispersing medium with the dispersed discrete aqueous globules or droplets of coating material and the aqueous dispersing medium being relatively immiscible with or relatively insoluble in each other.

Conventional lacquers, enamels and paints, both water-base and oil-base, have various limitations. They have to be thinned or adjusted to proper spreadable viscosity and in order to produce a satisfactory surface coating, a single coating must be evenly applied on a well prepared non-porous surface. If the coat is too thick, the material is apt to sag, wrinkle, alligator or even blister. These conventional coating materials may be applied on surfaces which are relatively smooth and of uniform texture. If a texturized or stippled finish is desired, this requires a separate operation after an initial coating has been applied. If a coating employing two different separate colors is desired, this has required separate operations. If the surface to be coated is of non-uniform porosity, it is difficult to achieve an even uniform surface coating.

In order to overcome some of the foregoing limitations of conventional coating materials, aqueous emulsions and latices have been employed. As water-thinnable vehicles, these have distinct advantages, but have not provided readily variable and controllable textures, and have not avoided limitation to one-color coatings. In such compositions it is the practice to place coloring materials in the outer dispersing medium only, so that on intermixing two or more compositions having different colors, a substantially uniform blend of pigments is obtained rather than a distinct multi-color coating or effect upon application to a surface. Moreover, if the resinous or solvent-based particles were pigmented, multi-colored coatings would still be unattainable by this means, since the small particle size required for good film formation would prevent the visual distinction of one particle from another.

One means for overcoming the difficulties and limitations in the use of conventional coating compositions and aqueous emulsions and latices is that disclosed in my prior U.S. Letters Patent No. 2,591,904, granted Apr. 8, 1952. In accordance with the compositions of the patent, it is possible to provide multi-colored textured coating materials. The coating compositions of said patent employ an aqueous dispersing medium, containing a suspension stabilizer, in which medium dispersed particles of an enamel or other organic solvent based coating composition are essentially immiscible. The separation of the dispersed organic solvent based coating composition in the aqueous dispersing medium is accomplished by employing in the dispersed droplets organic solvents which are immiscible with the aqueous phase and coating materials which are essentially insoluble in the aqueous dispersing medium. While the compositions of this patent have been widely accepted, the requirement that they employ organic solvents provides certain disadvantages. Organic solvents may introduce some fire hazards, toxicity problems and objectionable odors. Also, suitable organic solvents are often somewhat expensive. Because of these limitations in the materials which may be employed, efforts have been directed to provide coating compositions free from these disadvantages.

It is an object of the present invention to overcome the limitations in coating materials of the prior art by utilizing a new and distinct concept in producing coating compositions.

It is another object of the present invention to provide coating compositions which can be applied to both porous and non-porous surfaces, damp as well as dry surfaces, to form adherent, hard, sound, non-peeling coatings of a thickness, texture and covering ability, each of which can be varied within substantial ranges.

It is a further object of th epresent invention to provide coating compositions which contain discrete globules or droplets of coating materials, some of which are different either from one another or from the dispersing medium in composition, color, or shade, the compositions being applicable to various types of surfaces in a single application to produce multi-colored or multi-hued coatings in which the different colors or hues of the globules or droplets remain distinguishable after the coating has hardened.

It is also an object of the present invention to provide coating compositions in which the solvents employed are aqueous or water-miscible, not requiring water-immiscible, solvents in any phase of the composition.

It is another object of the present invention to make use of various forms of commercially available water-thinnable coating materials, such as water-soluble resins, natural or synthetic latices, emulsions of non-aqueous coatings, or coarse dispersions of water-insoluble materials, in the preparation of coating compositions which have new and valuable properties not possessed by the starting materials.

It is a further object of the present invention to provide coating compositions which allow the production in a single application of textured, multi-colored, or otherwise unique coatings from inorganic materials such as water-soluble alkali silicates or water-dispersible ceramic frits.

It is also an object of the present invention to provide a simple means for preparing dry coating materials which can be reconstituted upon addition of water or aqueous compositions, and especially a means for preparing such dry coating materials which contain separate elements different from one another in color, and on reconstitution form a multi-color coating composition.

The foregoing and other objects and advantages of the present invention will be explained and will be apparent to those skilled in the art from the present description.

The new and unexpected results and effects of the present invention are obtained by means of coating compositions comprising more than one aqueous medium, the said aqueous media being relatively insoluble in, or immiscible with one another, and one or more of the aqueous media containing coating materials such as pigments, dyes, fillers, binders, etc. In many cases, though not all, one of the aqueous media will be comprised of discrete aqueous globules or droplets which are dispersed in a second aqueous medium, and the globules will remain substantially separate and distinct from one another. In other cases the dispersion may be transient, so that while the two aqueous media remain distinct from one another, the dispersed aqueous globules tend to coalesce in the absence of agitation, sometimes forming a separate continuous layer, but becoming redispersed with further agitation.

By the term "aqueous medium," I refer to any composition containing water, but do not exclude the presence, in minor quantities, of any other solvents or components. Generally, such other solvents should be water-miscible. The water may be present in any form, such as solvent, or as solute, or as suspending medium, or as component of a colloidal solution.

The size of the dispersed globules or droplets of complete coating material will depend upon the effect which it is desired to produce. When a visible multi-colored effect is to be produced, a pattern of separate colors or hues must be provided in which many of the elements or groupings of the pattern are distinguishable by the naked eye. For this purpose, many, and preferably most, globules must be relatively large, such as above 50 microns in size, and will often be on the order of 100 to 1000 microns or larger. When the dispersions are transient and the globules or droplets readily coalesce with one another during film applications or setting, visible patterns may be produced from smaller globules which before coalescence would be difficult to distinguish from one another. In any case, however, the size of the dispersed globules will be much greater than colloidal dimensions (which are in the order of 0.001 to 0.1 micron), with at least a substantial number, and preferably most, of them larger than about 25 microns.

The dispersions of this invention may be either stable or transient; that is, the character and function of the several aqueous compositions determine whether the dispersed droplets or globules may or may not coalesce with one another. If, for example, the dispersed globules are of different colors, they must remain essentially separate and distinct in order to produce a satisfactory multi-color effect. If the dispersed globules are all of one color, and the dispersing medium of another color, it may be preferable that the dispersed globules tend to coalesce with one another during film formation. If the dispersed globules are very small, some coalescence may be required to produce a pattern of visible size or desirable appearance.

In preparation of stable dispersions of the invention, it is desirable that the specific gravities of the dispersed aqueous droplets or globules of coating material and the dispersing medium be as near to one another as possible. This minimizes packing tendencies and promotes stability. The relative specific gravities of these two components may be varied by selection of the additives to be introduced into one or the other of the two phases. Where small differences in specific gravities are not readily obtainable, it is usually desirable to employ a dispersing medium of greater viscosity than would otherwise be required in order to prevent the dispersed globules from rapidly settling out.

In the preparation of transient dispersions it may be desirable that the specific gravities of the dispersed droplets and dispersing medium be different from one another. Generally, however, this difference should not be too great, as it then tends to inhibit desirable pattern formation.

The stable dispersions of this invention are characterized by the fact that the dispersed globules themselves comprise a complete coating material which is dispersed as discrete globules in a second aqueous medium. These coating compositions are provided by rendering the dispersed globules insoluble or immiscible in the aqueous dispersing medium without substantially altering their film-forming characteristics. Since at least a substantial number of the dispersed globules are sufficiently large to be visibly distinct from one another, the dispersions have unique properties entirely different from those of colloidal dispersions or water-thinnable coating compositions such as latices. Many of these conventional materials are useful as components of the dispersed globules of the present invention, but in themselves can in no way provide its principal objectives.

The coating compositions of the invention, whether they contain a single or multiple-colored coating materials, may be applied by a single coating operations, such as by using a conventional spray gun, although brushing, rolling, dipping and the like, can be employed, to produce coating layers of unique textures, character and appearance. The multi-colored composition may be applied with conventional spraying equipment to produce in a single operation a hardened coating film in which the differently colored areas are readily visible to the naked eye or with the aid of a lower power magnifying glass. This permits the achievement of many striking and unique color effects.

It is possible to produce dispersed discrete aqueous globules or droplets of coating material in various shapes, such as spherical, teardrop, filament or other odd shapes whereby the particles retain their shape upon application and thus produce a finished coating in one of many textures and appearances. In this specification, and in the appended claims, the terms "globules" and "droplets" will be used interchangeably to specify this component of the compositions. The coated surfaces can be produced by a single operation so as to have a speckled or multi-colored appearance. It is also possible to provide special textures of a single or mixed colors such as a stippled finish that can be obtained simply by spraying a properly adjusted dispersion on the surface to be coated. With certain types of compositions according to the invention, application by brushing leads to striping or swirling effects of many types, some of which resemble the grain or mottling of natural materials, such as wood. Coating layers of varying degrees of porosity can be produced such as coatings ranging from films that have only microscopic porosity to films that are actually scattered sufficient to allow the background or an undercoat to show through. Coatings of controlled porosity are particularly suitable for application to surfaces of fabrics, leather, paper, straw hats and acoustical materials used on ceilings or walls.

The present invention makes possible the production of heterogeneous coatings in which the separate portions differ from one another in some component other than coloring matter, such as binders, fillers, and the like. These coatings may have desirable physical properties not attainable either through homogeneous compositions, or through heterogeneous compositions of small particle size, such as those obtained by mixing different emulsions or latices. The present compositions may also avoid or reduce certain difficulties encountered with many heterogeneous dispersions of small particle size, such as poor gloss or poor film intergrity arising from incompatible components.

Coating compositions of the present invention may also be used to achieve in a single treatment coatings which are substantially thicker than have been considered possible with conventional coatings. Coating films of a thickness of 5 mils can readily be produced in one application using the compositions of the invention.

It is also possible to incorporate into the compositions of the present invention separate solid particles or fillers which are in themselves not usually classified as coating materials but which impart desirable properties to the resulting film. Thus for example, sand, glass beads or fibers, metallic fibers or powders, mica powder, cellulose and asbestos fibers and the like, may be employed in either the discrete dispersed aqueous globules or droplets or in the dispersing medium. The finished film may imbed these filler materials without completely coating them.

The pigment or dye and binder components of the coating materials used are incorporated into the discrete dispersed aqueous globules or droplets and may also be incorporated into the aqueous dispersing medium. If coloring materials are employed in the outer phase or dispersive medium, the phase may form part of a multicolor film. Or it may contain unpigmented binder, forming a clear-coat or overlay for colored portions of the film provided by the dispersed globules or droplets.

THE INSOLUBILIZING SYSTEMS

In addition to containing pigments, dyes and binders, the dispersed aqueous globules and dispersing media may also contain materials serving to promote satisfactory insolubilization of or rendering immiscible these dispersed and dispersing phases in one another.

By "insolubilization" I refer to the process of treating aqueous compositions so that on intermixing, either the original components or the resultants of such intermixing have only limited solubility or miscibility in one another, forming a composition of two or more distinct aqueous phases, wherein the coloring materials which they may embody are retained essentially separate and distinct withing their respective phases, i.e., the globules or droplets on one hand or the dispersing medium on the other. Situations are thereby included in which all resulting components, either dispersed or dispersing, are liquid or relatively fluid or semi-fluid, and may be called immiscible or insoluble in one another, as well as situations in which one or more of the resulting components is a soft or firm gel. It is this immiscibility or insolubility of aqueous components which makes possible the formation of satisfactory dispersions which comprise the coating compositions of this invention.

Insolubilization may be achieved through one or more of numerous means, which may be used singly or in combination with one another. In some cases, suitable materials may be employed which tend to swell without completely dissolving in aqueous media, or available materials can be modified, such as by polymerization or cross-linking, to render them satisfactory insoluble or immiscible. In other cases the required solubility characteristics may be attained through selective solvent formulation, as by modification of aqueous media with alcohols, or by change in temperature, or by change in pH. It will sometimes be found that certain resins form aqueous solutions which tend to be immiscible with aqueous solutions of other resins. The scope of compositions providing satisfactory dispersions is especially enlarged by the use of hydrophilic colloids, which serve to promote insolubilization or rendering immiscible when employed in relatively small proportions, especially when used in conjunction with other colloidal or non-colloidal materials which tend to associate or interact specifically with them.

The most effective means of providing insolubilization can be considered under two categories: dispersions which are attained primarily through rendering insoluble or immiscible one or more aqueous phases in another, and dispersions which are attained primarily through mixing two or more immiscible aqueous phases with one another. These two categories are related to stable and transient dispersions, respectively.

Considering first the stable dispersions, insolubilization in this case must not only provide phase separation by preventing solution of the dispersed phase in the dispersing medium, but must also be adequate to prevent appreciable coalescence of the dispersed globules or droplets with one another. The dispersed droplets or globules of coating material are therefore gelled to some degree, but generally no more than necessary to avoid coalescence and provide adequate containment of coloring materials in the discrete dispersed globules.

It is well known that many aqueous coating vehicles can be precipitated from solution or flocculated from dispersion in a variety of ways. Solutions of alkali silicates or water soluble alkyds, for example, may be gelled or precipitated by lowering the pH or adding multivalent cations such as Al or Ca. A latex can sometimes be gelled by ageing, heating, or addition of sufficient electrolytes to inactivate the stabilizing surfactants. By those skilled in the art it is readily understood, however, that when such operations as these are carried out, the resulting aqueous mixture is no longer a usable coating composition. The precipitated material, while it may contain a certain proportion of water associated with it, is no longer in the kind of solvated state which is necessary for laying down a continuous, coherent film from the aqueous composition. The state of such material, for example, may be that of rigid gels, a sticky precipitate, or a gummy flocculant.

I have found that while most commonly used aqueous coating compositions cannot be satisfactorily insolubilized as such, the materials commonly known as hydrophillic colloids constitute a striking exception. This is particularly true of the organic macromolecular colloids, in which the colloidal particles are commonly considered to be substantially single molecules. As organic polymers of high molecular weight, these are typically film-forming materials.

It is well known that hydrophilic colloids can be gelled or precipitated from solution in many ways. It has not been recognized, however, that they can be insolubilized in such a manner as to provide aqueous globules or droplets of greater than colloidal dimensions dispersed in another aqueous medium, where the resulting aqueous dispersion has the following properties:

(1) The dispersed globules have a consistency which enables them to coalesce with one another or with the surrounding vehicle upon deposition as a film.

(2) If the dispersed globules are colored, they retain coloring matter substantially intact within themselves, without dissipation into the surrounding medium, (3) If the dispersed globules are colored differently from one another, they remain separate and discrete, without substantially coalescing with one another.

I have found that these objectives can be attained if at least some of the coating material in the dispersed phase is a hydrophilic colloid. As described hereinafter, it is only necessary that the hydrophilic colloid solution should be appropriately insolubilized by use of well-known insolubilizing agents placed in the dispersed and/or dispersing phases.

The method and degree of insolubilization will vary to some extent according to different aspects of the invention. In all cases, however, the suitable kind of insolubilization is that which converts the hydrophilic colloid solution to a coherent mass of a well hydrated, fine-structured gel. The kind of insolubilization which is to be avoided is that which yields coarse, stringy, non-homogeneous precipitates which lose substantial proportions of the water of the original colloidal solution.

A typical preferred method of insolubilization involves first, addition of an insolubilizing agent to a complete coating material comprising an aqueous hydrophilic colloidal solution, the concentration of insolubilizing agent being sufficient to convert said solution to a viscous to gelatinous, substantially homogeneous mass, without substantial loss of fluid from the total composition. Secondly, this partially insolubilized coating composition comprising the hydrophilic colloid is then dispersed in an aqueous medium containing an insolubilizing agent for the said hydrophilic colloid in concentration sufficient to prevent solution of the dispersed coating composition, but insufficient to precipitate its components or to alter substantially its degree of hydration. For this purpose the activity of insolubilizing agents in the dispersing medium will be similar to, but often somewhat greater than that of insolubilizing agents in the dispersed phase.

It is especially unexpected that hydrophilic colloids can be used in relatively small proportions to permit satisfactory insolubilization of a wide range of aqueous coating materials or film-formers which are not hydrophilic colloids, which in themselves could provide at best only the commonly known coarse precipitates or flocculates or rigid gels. Briefly, this is accomplished by having present both the hydrophilic colloid and a primary film-forming material, then insolubilizing this mixture with one or more insolubilizing agents which act upon the hydrophilic colloid, but are substantially inactive with respect to the primary film-forming material. In this way the primary film-former can be insolubilized without substantially altering its original state of solution or dispersion, thus retaining its film-forming characteristics. It will be understood that this greatly enlarges the scope of aqueous coating materials which are subject to multicolor treatment according to this invention.

In either case, therefore, whether the hydrophilic colloid is the primary coating in the dispersed phase or only a component added to permit satisfactory insolubilization of another coating material or film-former, the invention is typically carried out by means of insolubilizing systems which consist essentially of two components:

(1) A hydrophilic colloid.
(2) An insolubilizing agent for said hydrophilic colloid.

The materials commonly termed hydrophilic colloids are well known and widely used in many chemical industries for many different purposes. By way of illustration, some of the hydrophilic colloids which can be used in the insolubilizing systems of this invention are:

(1) Cellulose derivatives, such as methyl cellulose and other alkyl ethers of cellulose, carboxyalkyl ethers of cellulose or their salts, such as carboxymethyl cellulose, and hydroxyalkyl ethers of cellulose, such as hydroxyethyl cellulose.

(2) Proteins, such as casein, zein, and other vegetable and animal derivatives.

(3) Carbohydrates, such as starch, pectins, etc.

(4) Natural gums, such as gum tragacanth, gum arabic, locust bean gum, guar gum, algin, Irish moss, etc.

(5) Synthetic polymers, such as polyvinyl alcohol, polyethylene oxide, polyacrylic acid or its salts, copolymers of maleic anhydride with vinyl compounds such as styrene, or their salts, etc.

Unless dry granules are to be produced, as will be described hereinbelow, it is the purpose of the insolubilizing agent to convert fluid coating materials or film-formers to viscous, gelatinous globules rather than rigid gels or precipitates. It will be understood that the degree of gelation is dependent largely on the concentration of insolubilizing agent used. The specific type is not critical, but will be chosen to provide the desired activity or gelation at appropriate concentrations.

The practical insolubilizing agents are those which are active at concentrations of about 0.1% to a few percent, but preferably no more than about 1 or 2%. Agents which are active at less than about 0.1–0.25% must be used cautiously, as they may function more as precipitants than as gelling agents. In small proportions, however, some of these may sometimes be useful in reinforcing the effectiveness of the primary insolubilizing agent.

Hydrophilic colloids are of great diversity, and a short textbook would be required to list all the applicable means of insolubilizing each one. However, the means of insolubilizing various hydrophilic colloids are known to the art and references can be found in many texts and in the literature of many suppliers of hydrophilic colloids. Most of these insolubilizing systems are potentially applicable to the practice of this invention, either singly or in combination with other systems.

It will be understood that the most effective means of insolubilizing a given hydrophilic colloid is dependent primarily on its chemical type. For example, listed below in Table I are some of the broader classes of organic hydrophilic colloids, with some of the more effective insolubilizing agents for each class.

TABLE I

| Hydrophilic colloid | Insolubilizing agent |
|---|---|
| Polymers containing recurrent carboxyl groups, such as carboxymethyl cellulose, styrene-maleic acid copolymer, generally solubilized as alkaline salts. | Salts yielding polyvalent cations and a pH of no more than about 7, such as $CaCl_2$, $MgSO_4$. |
| Polymers containing recurrent hydroxyl groups, such as sodium carboxymethyl cellulose, polyvinyl alcohol. | Chelated titanium esters, such as titanium lactate. |
| Natural galactomannoglycans and their derivatives, such as guar gum, locust bean gum; starch and its derivatives; polyvinyl alcohol and vinyl alcohol copolymers, such as vinyl acetate-vinyl alcohol. | Salts yielding borate ions and a pH of at least about 7, often in conjunction with salts yielding phosphate ions, for example $Na_2B_4O_7$, $(NH_4)_2B_4O_7$, $Na_5P_3O_{10}$, $(NH_4)_2HPO_4$. |
| Water soluble cellulose ethers, such as methyl cellulose, ethyl cellulose. | Water soluble salts of chlorinated phenols, such as sodium pentachlorophenol. |
| Many macromolecular polymers such as polyvinyl alcohol, polyethylene oxide, casein, starch, water soluble cellulose derivatives, such as ethers and carboxylic ethers. | Tannic acid and water soluble salts thereof. |
| Many types of macromolecular polymers such as those above, especially those which are predominantly linear and high in molecular weight, such as polyoxyethylenes, water soluble cellulose derivatives, polyvinyl alcohol, guar gum. | Colloidal magnesium aluminum silicates. |
| Associated complexes of colloidal magnesium aluminum silicates with organic hydrophilic colloids. | Salts yielding polyvalent cations which increase the viscosity of colloidal magnesium aluminum silicate dispersions; especially salts yielding Ca, Mg ions, such as $CaCl_2$, $MgSO_4$. |
| Colloidal sols of polymers containing recurrent carboxyl groups in free acid form, such as Carbopol 934 (a vinyl copolymer) and Acrysol ASE-60 (an acrylic copolymer). | Water soluble macromolecular polymers containing recurrent basic groups, such as polyvinylpyrrolidone-vinyl acetate copolymer. |

In addition to these well known insolubilizing systems, I have found in particular that a number of hydrophilic clays (colloidal magnesium aluminum silicates) are desirable insolubilizing agents for nearly all types of organic hydrophilic colloids. When such clays are combined with organic hydrophilic colloids, agents which tend to insolubilize either the hydrophilic inorganic clay (such as a and Mg ions) or the organic hydrophilic colloid are then especially effective in insolubilizing the whole composition. This is especially advantageous in that these hydrophilic inorganic clays can interact with nonionic organic colloids such as polyoxyethylenes and guar gum, as well as with carboxyl and hydroxyl containing resins. As illustrated in Example IV, below, colloidal silica functions in a manner similar to hydrophilic clays.

It will be evident to those skilled in the art of hydrophilic colloids that a great many insolubilizing agents are potentially useful in producing the required gel droplets or globules and that the pertinent agents will readily be suggested by the chemical nature of the hydrophilic colloid. In practice, however, I have found that aside from inorganic hydrophilic colloids, such as hydrophilic clays, the most generally convenient insolubilizing agents are water soluble inorganic and metal organic salts. Since pH is often important in insolubilization, this can of course be adjusted by minor additions of acids or alkalies, but is often more readily controlled by use of acidic or basic salts. It is believed that the selection of insolubilizing salts will be wholly evident to those versed in the art of hydrophilic colloids.

In those cases where the hydrophilic colloid is not the primary film-former, it is often desirable to limit the proportion of hydrophilic colloid to the minimum possible amount in order to minimize water sensitivity. In this situation the preferred hydrophilic colloids are the organic macromolecular polymers which are characterized as predominantly linear rather than spherocolloids. (This is a practical and understandable classification of colloids proposed by Staudinger and discussed in many texts such as Jirgensons and Straumanis, A Short Textbook of Colloid Chemistry, p. 197ff, John Wiley & Sons, New York, 1954.) The linear colloids are noted in particular for forming high viscosity solutions at low concentrations, and for their ability to form the structural framework required for gelation with a minimum number of intermolecular junctions. These characteristics are enhanced as the molecular weight of the polymer is increased.

The preferred types of linear colloids include especially those which can be insolubilized by hydrophilic clays or by salts yielding borate ions; for example, the polyoxyethylenes, various types of guar gum and its derivatives, and various copolymers of polyvinyl alcohol. The preferred insolubilizing agents then include not only borates, but also salts yielding phosphate and carbonate ions; for example, $Na_2B_4O_7$, $(NH_4)_2B_4O_7$, $(NH_4)_2HPO_4$, $$Na_5P_3O_{10}$$

$Na_3PO_4$, $NaHCO_3$, $Na_2CO_3$; water soluble polymeric esters of boric acid, such as glycol bori-borate, and salts yielding polyvalent cations such as Ca, Mg, which increase the viscosity of colloidal magnesium aluminum silicate dispersions.

An important aspect of the stable dispersions of this invention is the attainment of satisfactory insolubilization without adversely affecting the film-forming characteristics of the dispersed globules or droplets. This is related not only to the concentration of insolubilizing agent, but also to its distribution in the dispersed and dispersing media.

For optimum film-forming characteristics it is generally desirable that the gelatinous dispersed globules should be viscous but no more firmly gelled than necessary to provide the desired size, prevent coalescence of globules with one another in the liquid composition, and avoid solution of globules in the dispersing medium. In particular it is necessary to prevent appreciable loss of coloring matter from the dispersed particles into the dispersing medium, which generally arises from partial solution of the dispersed particles or globules.

It is generally found that if insolubilizing agents are used only in the phase containing the hydrophilic colloid, this coating composition must be gelled to a high degree to prevent loss of coloring matter to the dispersing medium. The type of gels required for preventing color mixing would therefore not be desirable as a coating composition.

If insolubilizing agents are placed in the dispersing medium, I have found that it is possible to achieve color containment with globules which are much more fluid and less firm than could otherwise be used. If only globules of small size are desired, it may even be sufficient to use insolubilizing agents in the dispersing medium only. For most purposes, however, it is preferred that many of the dispersed globules or droplets should be sufficiently large to be readily distinguishable from one another and also that there should be no excessive quantity of very small globules, which tend to muddy multicolor patterns produced from the paint. In order to achieve these ends, the colloidal solution which is to comprise the dispersed droplets or globules should generally be relatively viscous before addition to the aqueous dispersing medium. While to some extent this bodied character can be provided by conventional means of formulating coating vehicles, it is preferable that it be attained at least in part by partially insolubilizing the hydrophilic colloid contained in the composition.

In some cases (as in Example II below) the hydrophilic colloid can be so chosen that its aqueous vehicle forms a gel at ordinary ambient temperatures, but a liquid vehicle at higher or lower temperatures. In this case the vehicle can be compounded at a temperature at which it is liquid, and thereafter become substantially insolubilized by a change in temperature as the insolubilizing agent, without the use of a specific chemical insolubilizing agent. More often the vehicle or solution containing the hydrophilic colloid is desirably insolubilized to a moderate degree by mixing with an insolubilizing agent, and this partially insolubilized material is dispersed in an aqueous medium of similar, but preferably somewhat greater insolubilizing activity.

By the term "insolubilizing activity," reference is made both to the type and concentration of insolubilizing agent or agents. For example, it may be desirable that both phases contain similar concentrations of a first insolubilizing agent, but that the dispersing medium contain additionally a second insolubilizing agent. Alternatively, both phases may contain similar concentrations of different insolubilizing agents, with the agent in the dispersing medium being more active for the same concentration. It will be understood that numerous variations are possible in accordance with the general principle of balancing insolubilizing activity in the two phases, but with somewhat greater activity in the dispersing medium.

By this means it is possible to obtain medium to large size particles which are well solvated and semi-fluid in character, yet adequately contain their coloring materials, do not appreciably coalesce with one another in the liquid coating composition, yet on deposition form relatively smooth, coherent films displaying an attractive multicolor pattern.

In addition to the relationship to particle consistency, an important aspect of insolubilizing activity is the tendency of dispersed particles to shrink or swell when placed in the dispersing medium. Excessive swelling results from inadequate insolubilizing activity of the dispersing medium, and, if extreme, can lead to unnecessary dilution and unusual solvent requirements. Excessive shrinking results from too much insolubilizing activity of the dispersing medium, and can result in particles of undesirable hardness.

In addition to the factors discussed hereinabove, the tendency of dispersed globules to coalesce with one another can be reduced by balancing as nearly as possible the specific gravities of the dispersed and dispersing phases, and also by the use of a dispersing medium which displays thixotropic characteristics. The dispersing medium then has buoyant properties which resist the tendency of dispersed particles to press upon one another, even though specific gravities are not precisely balanced.

Considering now the transient dispersions, it is not necessary or desirable, in this type of composition, that all dispersed globules should remain permanently and completely discrete from one another. They are typically not gels, but droplets of a fluid coating composition. Insolubilization in this case, therefore, involves the provision of two immiscible aqueous film-forming compositions. I have found that this is readily accomplished when at least one of these is a colloidal solution of a macromolecular hydrophilic colloid. The other may be a colloidal solution of another macromolecular polymer, or water-thinnable film-former which is fluid at higher solids concentration than most hydrophilic colloids. Each film-former, however, must be substantially in solution in the aqueous medium, rather than a dispersed film-forming material, such as a latex or emulsion. Particularly useful as one of the film-forming vehicles are the synthetic organic polymers which can be solubilized in water by alkali, ammonia or amines, sometimes in conjunction with water miscible organic coupling solvents such as t-butanol, butoxyethanol; for example, the water-dispersible alkyds.

The attainment of adequate immiscibility is dependent on the incompatibility of the film-forming vehicles, the concentration of film-former in each vehicle, and the weight ratio of one film-former to the other. Since immiscibility increases with increasing concentration, the preferred concentration of film-formers is the highest which will permit the desired flow properties. With hydrophilic colloids, this may sometimes be less than about 10%, but with other aqueous vehicles is generally at least 20%.

In published literature relating to hydrophilic colloids, data is often given concerning vehicles with which their solutions are immiscible. It is unexpected, however, that such aqueous vehicles could be colored differently from one another and thereafter intermixed, without blending of colors, to form unique multicolor coating compositions. In Table II below are listed some of the hydrophilic colloids and other film-forming materials whose aqueous solutions tend to be immiscible with one another.

TABLE II.—IMMISCIBLE VEHICLES

| | |
|---|---|
| Arolon 304 (a water soluble resin, Archer-Daniels-Midland Co.). | Many hydrophilic colloids, such as polyvinyl alcohol, polyethylene oxide, some proteins, and many cellulose derivatives such as alkyl ethers, carboxyalkyl ethers, and water-soluble cellulose acetate; also materials such as glycol bori-borate, polyvinylpyrolidone-vinyl acetate copolymer, and water-soluble salts of styrene-maleic anhydride copolymer. |
| Water-soluble cellulose acetate (17% acetyl). | Arolon 304, Arolon 1001 (both water-soluble resins from Archer-Daniels-Midland Co.) and Latok-1 (a water-soluble resin from T. F. Washburn Co.). |
| Some colloidal protein solutions such as Swift & Co.'s Technical Protein Colloid No. 69. | Many hydrophilic colloids such as polyvinyl alcohol, polyethylene oxide, and many cellulose derivatives such as alkyl ethers, hydroxyalkyl ethers, and carboxyalkyl ethers. |
| Methyl cellulose | Arolon 304, Arolon 1001, Technical Protein Colloid No. 69, Latok-1. |
| Karaya gum | Polyvinylpyrolidone. |
| Polyacrylic acid | Polysodium methyl acrylate. |
| Elvanol 72-60 (polyvinyl alcohol, Du Pont de Nemours & Co.). | Gantrez AN (methyl vinyl ether/maleic anhydride, General Aniline Film Co.). |

As indicated hereinabove, the stable and transient dispersions require in effect different kinds of insolubilizing systems. In the stable dispersions, the insolubilizing agent for the hydrophilic colloid interacts with it to produce a gel which is insoluble in the dispersing medium, but has appropriate consistency for film formation. In the transient dispersons, phase separation is attained by means of a film-forming polymer whose aqueous solution is immiscible with the aqueous hydrophilic colloid. In certain cases, however, the insolubilization of stable dispersions may desirably employ both of these methods in conjunction with one another. This is illustrated in Example X below, in which the dispersing medium contains tannic acid as an insolubilizing agent for the methyl cellulose of the dispersed phase. The dispersing medium also contains a water soluble film-forming resin which is immiscible with the aqueous colloidal methyl cellulose.

The advantage of this combination of two methods of insolubilization is that it widens the scope of materials which can be insolubilized in such a manner that the globules have a desirable consistency for use as a coating composition. By use of an immiscible film-forming vehicle in the dispersing medium, coalescence of particles can be prevented while using lesser amounts of interacting insolubilizing agent than would otherwise be required.

In addition, it is of course satisfactory and sometimes desirable to use, in the stable dispersions, a film-forming vehicle in the dispersing medium which is not immiscible with the dispersed phase. For example, it may be either clear or colored differently from the dispersed phase, and serve as one color of a multicolor coating composition.

THE FILM FORMING MATERIALS

One of the most novel and useful aspects of the present invention is the use of hydrophilic colloids in relatively minor proportions to permit satisfactory insolubilization and dispersion as discrete globules in a second aqueous or dispersing medium of many coating compositions which in themselves could not be satisfactorily insolubilized. By this I mean that the aggregates formed from a flocculated latex, for example, would ordinarily not form a smooth and coherent coating on deposition from a dispersion of such aggregates. Even more obviously, a dispersion of rigid gels such as those derived from gelation of sodium silicate could not satisfactorily be deposited on a surface, as such gels would not adhere well to the surface or to one another.

As discussed hereinabove, the gelatinous materials derived from suitably insolubilized hydrophilic colloids can provide macroscopic dispersed globules of an entirely different consistency from that of ordinary flocculates, precipitates or rigid gels, and this property renders them useful as film-forming materials for the present invention. Although hydrophilic colloids are widely used in coating compositions, films formed from such materials alone would for many purposes not have satisfactory properties with respect to such factors as water resistance, exterior durability, and resistance to bacterial attack.

It is therefore especially useful and unexpected that hydrophilic colloids can be used in relatively small proportions to provide insolubilization of the types of coating materials or film-former compositions generally preferred in common usage. This includes, for example, the following types of film-forming materials:

(1) Water-thinnable dispersions, including natural and synthetic latices, such as rubbers, acrylics, and vinyls; emulsions of film-forming non-aqueous vehicles (either with or without non-aqueous solvents) such as emulsions of oils, asphalts, and alkyds.

(2) Water-soluble or water-reducible synthetic resins, such as urea-formaldehyde, melamine-formaldehyde, and resins solubilized by recurring carboxyl groups neutralized by alkali, ammonia or amines, often in conjunction with coupling solvents such as glycol ethers or alcohols; for example, the water-reducible alkyds.

(3) Inorganic film-forming materials such as the water-soluble alkali silicates.

(4) Aqueous dispersions of inorganic materials such as clays, fibers, metallic flakes or powders, ceramic frit or fusible ceramic powders, which are capable of forming coherent films either by air drying or by subsequent operations of baking, fusing, sintering, flame treatment or the like; and aqueous dispersions of organic polymers which are fusible by heat treatment.

Aside from the presence of insolubilizing systems, the coating compositions are commonly formulated in conventional manner, using pigments and other fillers, driers, plasticizers and the like, as required by the film-formers chosen. On application of these compositions, the desired coatings will often form by simple air drying, but in some cases will become effective only through subsequent chemical or heat treatment. In the latter event, the hydrophilic colloid will often function as a temporary binder which is destroyed by the heat treatment that activates the major film-former. For example, ceramics, and certain organic coatings such as polytetrafluoroethylene, become effective as binders only through heat treatment.

When the major film-former is a material other than the hydrophilic colloid, the propotrion of hydrophilic colloid need be no more than about 5% of the dry weight of the primary film-forming material. In many cases, such as present Examples III through VI below, the organic hydrophilic colloid can be on the order of 1% or less of the weight of major film-forming resin.

As would naturally be expected, the benefits of the invention become increasingly difficult to achieve as the proportion of hydrophilic colloid is decreased. It is readily envisioned that the gel matrix required to prevent solution and enclose the coating material is thereby reduced to a thinner and more widely spaced structure. In compositions of this nature, it is especially difficult to maintain coloring materials substantially isolated within the dispersed globules, without providing an undesirably rigid gel structure. With respect to multi-color coatings in particular, therefore, the compositions and methods disclosed are believed to be especially novel, useful, and unexpected.

For certain purposes, however, similar advantages may result from the disclosed compositions in which some of the dispersed globules or droplets comprise clear rather than colored film-formers. For example, unique iridescent effects may derive from intermixing dispersions of clear and colored globules. Moreover, the disclosed coating compositions possess unique advantages which are independent of the presence or absence of coloring matter. One of these is the capability of providing in a simple manner uniquely textured coatings in which the degree of texturing is readily and widely variable. Another advantage is the provision of means for applying in a single application much thicker coatings (such as 5 mils or more) than could be applied with conventional coating compositions. This is possible because of the rapid build and reduced sagging which naturally result from use of coating compositions consisting predominantly of relatively large gelatinous globules.

In one aspect, the present invention discloses means of providing discrete granules of film-forming material which are not to be used directly as a coating composition, but rather for producing dry powders. As illustrated in Example XII below, the dry granules can be made in such a manner as to be suitable for swelling on addition of water, thus forming a reconstituted coating composition. This will often require the use of some additive other than water, such as the buffering agent for modifying pH which is used in the present example.

The dry granules prepared by this process can also be used as plastic molding powders, or in forming coatings through processes requiring heat and/or pressure, such as fluidized bed coating, or milling operations used in producing smooth surface floor coverings.

When dry granules are to be produced, the discrete dispersed particles will be insolubilized sufficiently to provide relatively firm and rigid gels, in order to minimize cohesion of the granules during the drying operation. Relatively large proportions of hydrophilic colloid, such as up to about 10% of the major film-former, may also be required in order to contain the film-former within the gelled matrix of the hydrophilic colloid.

The compositions of the present invention are also suitable for forming discrete dispersed globules in which the major film-former is not an organic coating but a fibrous material such as asbestos or paper fibers. If the globules containing these materials are colored, for example, the dispersions are useful in producing films of multicolor paper.

One of the objectives for which the invention is particularly suitable involves dispersions of globules containing fusible ceramic powders or ceramic frit. In this case the hydrophilic colloid is readily burned out during the fusing operation. The dispersions are therefore applicable to the production of either smooth or textured, mono- or multi-colored ceramic glazes for use on ceramic bodies, or glass or metallic surfaces.

In addition to coating materials which require admixture with hydrophilic colloids for forming satisfactory dispersions, hydrophilic colloids themselves can also be used as the sole coating material. Examples of hydrophilic colloids useful for this purpose are given in column 7, lines 36–56, hereinabove.

Many macromolecular polymers which are hydrophilic colloids are in common use as coating materials or film-formers for indoor or specialty uses. Starch coatings, for example, are often used on acoustical ceilings. Casein or other proteins, vinyl acetate-vinyl alcohol copolymers, and various cellulose derivatives are used where cost is a dominant factor, where water removable coatings are desired, or where solvent or grease resistance is important. In many cases the water resistance of a hydrophilic colloid coating can also be increased by chemical and/or heat treatment after film formation. These materials may be employed as film-formers in the compositions of the present invention.

Pigments, metallic powders, and dyes are used as coloring matter for the coatings in this invention. Most of the pigments, metallic powders and dyes used in conventional coatings may be employed, but desirably they shall not be more than slightly soluble in water, and should not be detrimental to processes involved in forming dispersions. Pigments and dyes are generally incorporated in the vehicle before the addition of insolubilizing agents, by grinding in the usual manner, sometimes with suitable dispersing agents for the coloring matter. In the coating compositions of this invention they may be placed in either the discrete dispersed aqueous globules or in the aqueous dispersing medium.

METHOD OF PREPARING DISPERSIONS

The aqueous dispersions of this invention can be easily prepared, usually by inexpensive conventional mixing equipment such as commonly employed in the coating, food and pharmaceutical industries. For example, a simple tank or mixing kettle fitted with a suitable agitator such as a two-bladed rotary propeller-type agitator is generally adequate for preparing the dispersions.

The method of preparation will vary somewhat with the specific materials employed, but in general the method involves agitation of the dispersing medium in order to break down into globules or droplets the part of the composition which forms the dispersed discrete aqueous globule phase. In some cases, part, or all, of the dispersing medium may be formed from exudates of the composition forming the dispersed phase. In other cases, the dispersing medium, or portions of it, may be partly absorbed by the dispersed phase.

The medium to be dispersed, containing fillers, pigments, binders, hydrophilic colloids and insolubilizing agents, is generally prepared first and is then ready for addition to the dispersing medium. In many cases the dispersing medium can be prepared completely independently, so that after addition to the composition to be dispersed, production of the dispersion is completed by appropriate agitation. In other cases it may be preferable to add certain materials to the dispersing medium during the course of agitation and dispersing.

In preparing multiple dispersions, comprising two or more different coating materials dispersed in a single medium, the different coating materials can be dispersed separately in their own aqueous medium and thereafter mixed to form the complete dispersion. This is the generally preferred procedure. In many cases, it is possible to prepare such multiple dispersions by adding successively to the dispersing medium, the different compositions to be dispersed as discrete aqueous globules. When using this method, each composition to be dispersed should be fully dispersed before the addition of the next.

An alternative, but often less convenient method of preparing the dispersions, involves simultaneous insolubilization and dispersion. By this method, suitable treatments are carried out on a single aqueous composition, during which dispersed globules form with the composition, and the remaining material becomes the dispersing medium. Two or more such dispersions are then mixed to form the desired multiple dispersion.

An important factor in preparing the dispersions is the ease with which the size of the dispersed globules can be controlled. The size of the dispersed globules is influenced primarily by the degree of the agitation. In addition to ordinary rotary paddle-type agitators, other types of agitation such as shaking, tumbling, etc. may be employed. The greater the speed of agitation, the smaller the size of the dispersed globules. The decrease in size of the dispersed globules is also to some extent a function of increased time of agitation.

Other factors affecting globule size and shape are: relative insolubility of the dispersed phase in the dispersing medium; the viscosity and temperature of both of these phases; the ratio of the volumes of these two phases. At constant agitation, globule size tends to increase with greater insolubility and greater viscosity of the dispersed phase, with lower viscosity of the dispersing medium, and with lower ratio of discrete particle phase to dispersing medium phase.

Globule shapes are generally irregular, but tend to become more elongated with higher viscosity of the dispersed phase, and more spherical with lower viscosity of the dispersed phase, and more spherical with lower viscosity of the dispersed phase.

The viscosity and other properties of these dispersions are influenced by the volume ratio of dispersed phase to dispersing phase. The ratio chosen will depend upon the materials used, and the desired application. Very high ratios increase the problems of stabilization, and tend to give high viscosities, while very low ratios lead toward discontinuous or scattered effects of the dispersed globules. For most applications, a desirable ratio of dispersed phase to dispersing phase will be between 0.5:1 and 4:1.

Another factor often requiring consideration is the relative specific gravity of dispersed and dispersing phases. In many cases, as in multiple dispersions where a uniform mixture of components is desired, all phases should preferably have approximately equal specific gravities, to prevent non-uniform distribution on usage. In other cases a differential in specific gravity may be preferred, as in coating compositions designed to produce striping effects or a clear overlay.

Aqueous coating compositions in accordance with the present invention may be reduced to the dry or granulated state and thereafter be regenerated or reconstituted by the addition of an aqueous vehicle to dry or grandulated particles. Such a system is that illustrated by Example XII of the examples which follow. In accordance with that example, the dispersed discrete aqueous globules are rigidified and removed from the aqueous vehicle and subsequently dried to form granules. Upon adding the dried granules to a suitable aqueous vehicle containing a suitable buffering agent it was possible to produce regenerated aqueous single color and multi-color coating dispersions in accordance with the present invention.

In attaining dispersions by means of water-swellable rather than water-soluble resins, special procedures are required for introducing coloring matter into the dispersed globules. In such cases, soluble dyes are often more suitable than pigments, since the common practice of grinding pigments with the vehicle cannot be used, at room temperatures, without disrupting the material which on swelling forms the dispersed globules. Dyes soluble in water or in water-miscible solvents, can be incorporated into the globules by allowing them to swell within a solution of the desired coloring matter. The swollen globules may then be removed, and used in any desired dispersing medium which suitably inhibits the transfer of coloring matter to the outer phase.

Some water-swellable materials may also be colored before formation of the globules into the size and shape required for the swelling procedure. For example, a thermoplastic material may be pigmented at elevated temperatures, followed by attrition at lower temperatures into globules of the desired size. Swelling of the globules by the dispersing medium then completes the dispersion. The fact that in this coloring procedure, pigments may be used instead of dyes, often simplifies the maintenance of coloring matter within the swollen dispersed globules.

One particularly unique feature of the present invention is a coating composition of 2 or more distinct aqueous phases comprising at least one aqueous phase of discrete aqueous globules dispersed in an aqueous dispersing phase, wherein one or more of the phases is colored, and the dispersion either comprises a multi-colored composition in itself or, it capable of forming a multi-colored composition by mixing with another coating dispersion or coating composition containing in at least one phase a different color. It is believed that this is the first time that this has been achieved in a coating composition comprising a dispersion wherein both the dispersed and dispersing phases are aqueous. The production of such distinctly multi-colored compositions is made possible by the fact that the color in each phase does not migrate or blend with the color in another phase. Thus each phase retains its color integrity, thereby producing a multi-color coating when applied to a surface.

In the case of multi-color dispersions attained by mixing single-color compositions, the compositions to be intermixed may be either dispersions or homogeneous aqueous compositions which on intermixing with another aqueous composition provide a dispersed or dispersing phase. If a multi-color is to be produced, this will be produced by intermixing either two or more dispersed phases which are different in color from one another, or one or more dispersed phases which are different in color from the dispersing phase.

The ability to provide aqueous coating compositions which are multi-color dispersions or single-color compositions which will provide a multi-color dispersion upon mixing two or more single-color compositions, is made possible by producing the dispersion from two or more aqueous compositions which are either substantially insoluble in one another or substantially immiscible with one another, or partially insoluble and partially immiscible.

Where the dispersions of the invention are attained through the insolubility of one or more aqueous phases in another, any dispersed phase containing color must be sufficiently insolubilized to prevent appreciable transfer of color to the phase in which it is dispersed. Where the dispersions are attained through the immiscibility of two or more aqueous phases with one another, each phase must be an aqueous solution, wherein some of the solutes of the different solutions are partially incompatible with one another, and the incompatibility of the resulting solutions is sufficiently great to prevent appreciable transfer of color from one phase to the other. In accordance with the present invention, blending of colors is prevented through either insolubility or immiscibility of aqueous compositions, or through some combination of the two.

Another particularly unique feature of the invention is an aqueous coating composition comprising a stable dispersion in an aqueous dispersing medium of discrete aqueous particles or globules of a semi-fluid to gelatinous film-forming composition containing a minor proportion of a hydrophilic colloid and a major proportion of an aqueous coating material other than the hydrophilic colloid. As in conventional coating vehicles, the film-forming resins remain in a highly disperse state approaching colloidal or molecular dimensions, while the globular units which comprise them may be as large as 100 to 1000 microns or larger. The dispersed globules are suitable as a film-forming material because they are insolubilized in the aqueous dispersing medium without substantially flocculating or precipitating the film-forming elements of which they are composed. This is attained by use of insolubilizing agents which are active with respect to the hydrophilic colloid, but substantially inactive with respect to other film-forming materials, thus providing a matrix of a gelatinous colloidal solution intimately admixed with another coating material. This phenomenon of forming a second dispersion by re-dispersing discrete, coherent portions of a first film-forming solution or dispersion, is particularly suitable with coating materials of an organic nature, such as latices and emulsions, or, of an inorganic nature, such as a slurry of ceramic particles. Such coating compositions may be colored or uncolored, mono- or multi-colored.

In order more clearly to disclose the nature of the present invention, specific examples illustrating the present invention will hereinafter be described. It should be understood, however, that this is done solely by way of example and is intended neither to delineate the scope of the invention nor limit the ambit of the appended claims. Parts are expressed in terms of parts by weight, unless otherwise specified.

EXAMPLE I.—MULTI-COLOR METHYL CELLULOSE COATING COMPOSITION

Compositions A, B and C below were prepared by mixing in conventional manner the components listed.

Composition A.—Dispersing medium

| | Parts by wt. |
|---|---|
| Pentachlorophenol, sodium salt | 1 |
| Magnesium montmorillonite clay | 0.5 |
| Tannic acid | 0.25 |
| Water | 98.25 |
| Total | 100 |

Composition B.—Blue methyl cellulose base

| | Parts by wt. |
|---|---|
| Methyl cellulose (15,000 cps.) | 2.5 |
| Magnesium montmorillonite clay | 0.5 |
| Cobalt blue pigment | 1.25 |
| Trisodium phosphate, dodecahydrate | 0.01 |
| Water | 95.74 |
| Total | 100 |

Composition C.—Yellow methyl cellulose base

| | Parts by wt. |
|---|---|
| Methyl cellulose (15,000 cps.) | 2.5 |
| Magnesium montmorillonite clay | 0.5 |
| Cadmium yellow pigment | 1.25 |
| Trisodium phosphate, dodecahydrate | 0.01 |
| Water | 95.74 |
| Total | 100 |

Composition D.—Blue methyl cellulose dispersion

To 50 parts of composition A was added 50 parts of composition B, and the mixture stirred vigorously with mechanical agitators to produce a dispersion of blue particles visible to the unaided eye.

Composition E.—Yellow methyl cellulose dispersion

This was prepared in the same manner as composition D, but using composition C in place of composition B.

Composition F.—Multi-color blue-yellow methyl cellulose coating

Equal parts of compositions D and E were intermixed, and stirred until uniform dispersion was obtained having visible discrete blue and yellow particles dispersed therein.

Composition F was sprayed onto cardboard with a standard lacquer gun. Upon drying it provided a continuous even coating on the cardboard. The blue and yellow particles were easily seen by the naked eye after the coating film had hardened in place.

In the foregoing compositions, methyl cellulose provided the coating resin with the clay providing the insolubilizing agent in the dispersed phase and the insolubilizing agents in the dispersing medium were clay, sodium pentachlorophenol and tannic acid.

EXAMPLE II.—MULTI-COLOR MONOETHYL CELLULOSE COATING COMPOSITION

Composition A.—Blue monoethyl cellulose dispersion

| | Parts by wt. |
|---|---|
| 4% monoethyl cellulose soltuion in water | 81.8 |
| Cobalt blue pigment dispersion, 45% solids in water | 1.8 |

The pigment dispersion was mixed with the monoethyl cellulose solution at about 40° F. On warming the mixture to 90° F., without stirring, a firm gel was formed, with some exudation of liquid. After cutting the gel into large pieces, there was added:

| | |
|---|---|
| Water | 16.4 |
| Total | 100 |

With moderate mechanical stirring the gel was then broken up and dispersed in the outer phase.

Composition B.—White monoethyl cellulose dispersion

| | Parts by wt. |
|---|---|
| 4% monoethyl cellulose solution in water | 81.4 |
| Titanium dioxide dispersion, 33% solids in water | 2.4 |
| Water | 16.2 |
| Total | 100 |

This was prepared in the same manner as composition A.

Composition C.—Multi-color blue-white monoethyl cellulose coating

Equal parts of compositions A and B were intermixed, and stirred vigorously (3-paddle mixer, 900 r.p.m.) for about ¼ hour, until the dispersed particles approached the desired average particle size and were visible to the unaided eye. To 83 parts of this mixture there were then added, with moderate stirring, 17 parts of a 5% solution of sodium pentachlorophenol in water.

The resulting dispersion was relatively stable at a temperature (about 40° F.) at which monoethyl cellulose is water soluble.

Composition C was sprayed onto cardboard with a standard lacquer gun. The blue and white particles were easily seen by the naked eye after the coating film had hardened in place.

In this example the sodium pentachlorophenol assisted in insolubilizing the discrete dispersed particles in the dispersing phase.

EXAMPLE III.—MULTI-COLOR ACRYLIC LATEX COATING COMPOSITION

This example and the following one illustrate the formation of coating compositions in which the microscopic particles of latex dispersions are aggregated, along with coloring materials, into colored particles of visible size. In this way, conventional single-color dispersions can be employed in forming multi-color coating compositions.

Composition A.—Blue acrylic latex base

| | Parts by wt. |
|---|---|
| Acrylic latex, 46% solids (Rhoplex AC-33) | 50 |
| Cobalt blue pigment dispersion, 45% solids in water | 5 |
| 5% magnesium montmorillonite clay dispersion in water | 36.7 |
| After blending these components, vigorous mixing was employed for the incorporation of: | |
| 1.5% solution of ethylene oxide polymer (Polyox WSR-301) in water | 8.3 |
| Total | 100 |

Composition B.—Blue acrylic latex dispersion 50 parts of composition A were added to 50 parts of a 1% dispersion of magnesium montmorillonite clay in water. To carry out the dispersion, this mixture was stirred with a 3-blade paddle at 200 r.p.m. for about ¼ hour.

Composition C.—Yellow acrylic latex dispersion

This was prepared in a manner similar to composition B, using a yellow dispersion base equivalent to composition A. A cadmium yellow pigment dispersion was used in the yellow dispersion base.

Composition D.—Multi-color blue-yellow acrylic latex coating

Equal parts of compositions B and C were intermixed, and stirred until uniform dispersion was obtained.
Composition D was sprayed onto cardboard and onto a textile material with a standard lacquer gun. The blue and yellow particles were easily seen by the naked eye after the coating film had hardened in place.
In this example the acrylic latex was the primary film-forming resin and the ethylene oxide polymer the hydrophilic colloid. The clay provided the insolubilizing agent.

EXAMPLE IV.—MULTI-COLOR POLYVINYL ACETATE LATEX COATING COMPOSITION

Composition A.—Bodied latex base

| | Parts by wt. |
|---|---|
| Aqueous colloidal silica, 35% SiO$_2$ | 1.5 |
| Polyvinyl acetate latex, 55% solids (Gelva TS-66) | 98.5 |
| Total | 100 |

About one-fourth of the latex was first added to the silica sol, with mild stirring. After thickening developed, the remainder of the latex was added, and thoroughly blended.

Composition B.—Red polyvinyl acetate latex base

| | Parts by wt. |
|---|---|
| Composition A | 71.7 |
| 10% aqueous titanium lactate solution | 0.8 |
| 2% sodium carboxymethylcellulose solution | 7.5 |
| Naphthol red pigment, aqueous dispersion 29% solids | 3.8 |
| Water | 16.8 |
| Total | 100 |

Ingredients were added in the order listed, with thorough stirring after each addition.

Composition C.—Blue polyvinyl acetate latex base

| | Parts by wt. |
|---|---|
| Composition A | 58.3 |
| 10% aqueous titanium lactate solution | 1.5 |
| 2% sodium carboxymethylcellulose (high viscosity grade) solution | 7.3 |
| Water | 29.2 |
| Phthalocyanine blue pigment, aqueous dispersion, 32% solids | 3.7 |
| Total | 100 |

Ingredients were added in the order listed, with thorough stirring after each addition. In this case it was highly preferable to add the water before the pigment dispersion.

Composition D.—Dispersing medium

| | Parts by wt. |
|---|---|
| 10% magnesium sulfate solution | 5 |
| Nalquat G-8-13 solution, 5% solids [1-(2-hydroxyethyl)-2-n-alkyl-1-benzyl - 2 - imidazolinium chloride, 60% solution in isopropanol] | 40 |
| Water | 55 |
| Total | 100 |

Composition E.—Red polyvinyl acetate latex dispersion 75 parts of composition B were added to and dispersed in 25 parts of composition D. Only light stirring was required to give a fine particle dispersion, with the dispersed particles visible to the unaided eye.

Composition F.—Blue polyvinyl acetate latex dispersion

This was produced in the same manner as composition E, but using composition C in place of composition B.

Composition G.—Multi-color red-blue polyvinyl acetate latex coating 65 parts of composition E were mixed with 35 parts of composition F, and stirred until uniform dispersion was obtained.
Composition G was sprayed onto cardboard with a standard lacquer gun. The red and blue particles were easily seen by the naked eye after the coating film had hardened in place.
In this example the vinyl acetate latex was the primary film-forming resin or binder and carboxymethyl cellulose the hydrophilic colloid. Titanium lactate and silica were the insolubilizing agents of the dispersed phase. Nalquat and magnesium sulfate were the insolubilizing agents of the dispersing phase.

EXAMPLE V.—MULTI-COLOR WATER SOLUBLE ORGANIC RESIN COATING COMPOSITION

In contrast to preceding examples, in which material comprising the dispersed phase was first partly insolubilized and then added to the dispersing medium, in this example insolubilization and dispersion are carried out simultaneously. Insolubilizing agents are added gradually to the mixture of film-forming resin and hydrophilic colloid. As insolubilization occurs, gelatinous film-forming masses separate progressively from the mixture, and are broken into globules. When this process is complete, substantially all the coating materials and coloring matter are contained within the dispersed phase.
In this example, the polyethylene oxide is a linear macromolecular polymer which is partly insolubilized by the magnesium montmorillonite clay acting as an insolubilizing agent. In addition the clay forms an association complex with the organic hydrophilic colloid, and this complex is further insolubilized by the magnesium sulfate, acting as an insolubilizing agent for the magnesium montmorillonite clay.

Composition A.—Manganese drier emulsion

| | Parts by wt. |
|---|---|
| Drier, manganese, 6% | 45.5 |
| Polyoxyethylene sorbitol esters of mixed fatty and resin acids (G-1256–Atlas Powder) | 4.5 |
| Water dispersible lecithin | 4.5 |
| 1% sodium carboxymethylcellulose solution | 45.5 |
| Total | 100 |

The first three items were mixed, then stirred vigorously, with mechanical agitation, into the sodium carboxymethylcellulose solution.

Composition B.—Water soluble resin base

| | Parts by wt. |
|---|---|
| Water soluble resin solution (Arolon 304 of Archer-Daniels Midland Co.) | 73.2 |
| Composition A | 1.8 |
| 1% solution of ethylene oxide polymer (Coagulant grade) | 25.0 |
| Total | 100 |

Composition C.—Blue water soluble resin dispersion

Composition B was pigmented with aqueous pigment dispersions as follows:

| | Parts by wt. |
|---|---|
| Composition B | 44.4 |
| 50% cobalt blue pigment dispersion in water, containing 0.5% trisodium phosphate, dodecahydrate | 2.2 |
| 33% titanium dioxide dispersion in water, containing 0.3% trisodium phosphate, dodecahydrate | 2.2 |

To this successive additions of the following aqueous compositions were made, as follows, with stirring between additions:

| | |
|---|---|
| 4% magnesium montmorillonite clay | 24.4 |
| 5% magnesium sulfate | 1.2 |
| 4% magnesium montmorillonite clay | 12.2 |
| 5% magnesium sulfate | 1.2 |
| 4% magnesium montmorillonite clay | 12.2 |
| Total | 100 |

Composition D.—Yellow water soluble resin dispersion

Composition B was pigmented with aqueous pigment dispersions as follows:

| | Parts by wt. |
|---|---|
| Composition B | 40.5 |
| 50% cadmium yellow pigment dispersion in water, containing 0.5% trisodium phosphate, dodecahydrate | 2.0 |
| 33% titanium dioxide dispersion in water, containing 0.3% trisodium phosphate, dodecahydrate | 2.0 |

To this mixture successive additions were made, as follows, with stirring between additions:

| | |
|---|---|
| 4% magnesium montmorillonite clay | 33.3 |
| 4% magnesium montmorillonite clay, containing 1% magnesium sulfate | 11.1 |
| 4% magnesium montmorillonite clay | 11.1 |
| Total | 100 |

Composition E.—Multi-color blue-yellow water soluble resin coating 60 parts of composition C was intermixed with 40 parts of composition D, and the mixture stirred until uniform dispersion was obtained, with the dispersed particles visible to the unaided eye.

Composition E was sprayed onto cardboard with a standard lacquer gun. The blue and yellow particles were easily seen by the naked eye after the coating film had hardened in place.

EXAMPLE VI.—MULTI-COLOR POTASSIUM SILICATE COATING COMPOSITION

This composition is similar to that of Example V in that the primary film-former is a water soluble coating material. In this case, however, the primary film-former is inorganic rather than organic.

In this example, insolubilization was more readily carried out by mixing the insolubilizing agent with the primary film-former, then gradually adding the hydrophilic colloids. After separation and dispersion of gelatinous material, the process was completed by a final addition of insolubilizing agent.

Composition A.—Potassium silicate-clay mixture

| | Parts by wt. |
|---|---|
| Aqueous potassium silicate solution, 40.75° Baumé (Kasil #6) | 50 |
| 5% magnesium montmorillonite clay dispersion in water | 50 |
| Total | 100 |

Composition B.—Sodium carboxymethyl cellulose-poly(ethylene oxide) mixture

| | Parts by wt. |
|---|---|
| 2% sodium carboxymethyl cellulose (high viscosity grade) solution in water | 22 |
| 1.5% solution of ethylene oxide polymer (Polyox WSR-301) in water | 78 |
| Total | 100 |

Composition C.—Yellow potassium silicate dispersion

| | Parts by wt. |
|---|---|
| Composition A | 22.5 |
| Potassium silicate solution | 35.5 |

Mixture of these components was followed by addition and incorporation of:

| | |
|---|---|
| Cadmium yellow pigment dispersion, 33% solids in water | 5.6 |

This mixture was agitated by mechanical stirring at 200 r.p.m. during the addition of:

| | |
|---|---|
| Composition B | 31.7 |

After insolubilized portions had become well dispersed, stirring was continued during the addition of:

| | |
|---|---|
| Composition A | 4.7 |
| Total | 100 |

This had the effect of enlarging the average particle size through partial aggregation of particles.

Composition D.—Blue potassium silicate dispersion

This was prepared in the same manner as composition C, using an equivalent cobalt blue pigment dispersion in place of the cadmium yellow dispersion.

Composition E.—Multi-color yellow-blue potassium silicate coating 62 parts of composition C were intermixed with 38 parts of composition D, and stirred until uniform dispersion was attained. Composition E was sprayed onto cardboard and onto cinder block with a standard lacquer gun. The yellow and blue particles were easily seen by the naked eye after the coating film had hardened in place.

In this example potassium silicate is the major film-forming resin or coating binder and the ethylene oxide polymer is the principal hydrophilic colloid. The clay was employed as insolubilizing agent. The carboxymethyl cellulose also functions as a hydrophilic colloid which is strongly affected by the insolubilizing agent, but not as greatly as the polyethylene oxide. It therefore acts as a modifier of the gelling activity of the primary insolubilizing system. This prevents the gel syneresis which would otherwise occur, and maintains the gelatinous globules in a highly hydrated state, suitable for coalescence with one another during film formation.

EXAMPLE VII.—MULTI-COLOR PROTEIN COATING COMPOSITION

Composition A.—Base protein solution

| | Parts by wt. |
|---|---|
| Soybean protein | 14.0 |
| 10% aqueous ammonia | 3.93 |
| Pentachlorophenol, sodium salt | 0.07 |
| Water | 53.5 |
| 2.5% formaldehyde solution | 28.5 |
| Total | 100 |

After wetting the protein in cold water, the ammonia was added, and the temperature raised to 140° F. with moderate mechanical stirring. After maintaining at 140° F. for about 15 minutes, the pentachlorophenol was added to the mixture, as 5% solution. The formaldehyde solution was then added gradually, with thorough stirring between additions.

Composition B.—Yellow protein base

| | Parts by wt. |
|---|---|
| Composition A | 90 |
| 33% cadmium yellow pigment dispersion in water, containing 0.3% trisodium phosphate, dodecahydrate | 5 |
| 33% titanium dioxide dispersion in water, containing 0.3% trisodium phosphate, dodecahydrate | 5 |
| Total | 100 |

Composition C.—Blue protein base

| | Parts by wt. |
|---|---|
| Composition A | 90 |
| 33% cobalt blue pigment dispersion in water, containing 0.3% trisodium phosphate, dodecahydrate | 5 |
| 33% titanium dioxide dispersion in water, containing 0.3% trisodium phosphate, dodecahydrate | 5 |
| Total | 100 |

Compositions B and C were obtained by mixing the ingredients together.

Composition D.—Yellow protein dispersion

| | Parts by wt. |
|---|---|
| Composition B | 64.5 |
| 1% calcium chloride solution | 32.3 |
| 5% sodium carboxymethylcellulose (high viscosity grade) solution | 3.2 |
| Total | 100 |

This was prepared by adding composition B to 1% aqueous calcium chloride solution, and stirring until desired average particle size was obtained. The sodium carboxymethylcellulose was then added, with sufficient additional stirring to mix with the dispersing medium.

Composition E.—Blue protein dispersion

This was prepared in the same way as Composition D, but using composition C in place of composition B.

Composition F.—Multi-color yellow-blue protein coating

| | Parts by wt. |
|---|---|
| Composition D | 54.0 |
| Composition E | 36.5 |
| Water | 9.5 |
| Total | 100 |

Compositions D and E were intermixed, diluted with water, and stirred until uniform dispersion was obtained.

Composition F was sprayed onto cardboard with a standard lacquer gun. The yellow and blue particles were easily seen by the naked eye after the coating film had hardened in place.

In this example the protein was employed as the major resin or coating binder. The formaldehyde was employed as the insolubilizing agent for the dispersed phase and the calcium chloride for the dispersing medium. Carboxymethylcellulose was used as a rheological control agent.

EXAMPLE VIII.—MULTI-COLOR STARCH COATING COMPOSITION

Composition A.—Base starch solution

| | Parts by wt. |
|---|---|
| Cationic starch (modified starch) (Cato) | 5 |
| Water | 95 |
| Total | 100 |

The starch was stirred into cold water, then with continued stirring heated to 175° F. in about 5 minutes, and allowed to cool.

Composition B.—Ammoniacal borate solution

| | Parts by wt. |
|---|---|
| Boric acid | 5.0 |
| 10% aqueous ammonia | 14.5 |
| Water | 80.5 |
| Total | 100 |

Composition C.—Dispersing medium

| | Parts by wt. |
|---|---|
| Composition B | 10 |
| Calcium chloride | 1 |
| Water | 89 |
| Total | 100 |

A calcium chloride solution was added slowly, with stirring, to partially diluted composition B. The dispersing medium was used shortly after preparation.

Composition D.—Blue starch base

| | Parts by wt. |
|---|---|
| Composition A | 85 |
| 33% cobalt blue pigment dispersion in water, containing 0.3% trisodium phosphate, dodecahydrate | 5 |
| 33% titanium dioxide dispersion in water, containing 0.3% trisodium phosphate, dodecahydrate | 5 |
| Composition B | 5 |
| Total | 100 |

Composition B was added after pigmentation of the starch solution with the blue and white pigment dispersions.

Composition E.—Yellow starch base

This is the same as composition D, except that cadmium yellow pigment was used in place of cobalt blue pigment.

Composition F.—Blue starch dispersion

To 33 parts of composition C was added 67 parts of composition D, and the mixture stirred until the desired average particle size was obtained.

Composition G.—Yellow starch dispersion

This is the same as composition F, except that composition E was used in place of composition D.

25

Composition H.—Multi-color blue-yellow starch coating

Equal parts of compositions F and G were intermixed, and stirred until uniform dispersion was obtained.

Composition H was sprayed onto cardboard with a standard lacquer gun. The blue and yellow particles were easily seen by the naked eye after the coating film had hardened in place.

In this example starch was employed as the resin or coating binder. Ammonium borate was employed as the insolubilizing agent for both dispersed and dispersing phases and calcium chloride for the dispersing medium.

EXAMPLE IX.—MULTI-COLOR COATING COMPOSITION EMPLOYING IMMISCIBLE SOLUTIONS

Composition A.—Black polyvinyl alcohol solution

| | Parts by wt. |
|---|---|
| 10% polyvinyl alcohol solution in water (Elvanol 51–05) | 94 |
| Carbon black dispersion in isopropyl alcohol, 50% solids (Alcoblak 338, Columbian Carbon) | 6 |
| Total | 100 |

Composition B.—White protein solution

| | Parts by wt. |
|---|---|
| Refined animal protein solution (fluid colloid No. 69, Swift & Co) | 73 |
| Water | 24.5 |
| Titanium dioxide | 2.5 |
| Total | 100 |

Composition C.—Multi-color black-white polyvinyl alcohol-protein coating 67 parts of composition A were intermixed with 33 parts of composition B, and stirred with moderate agitation until equilibrium particle size was approached.

Shortly after stirring was interrupted, composition C was brushed onto cardboard with an ordinary paint brush. As the film was allowed to set, portions of the white composition tended to rise to the surface, giving a black-and-white pattern showing a striated effect in the direction of the brush strokes, which was plainly visible to the naked eye.

Similarly, composition C was sprayed onto cardboard with a standard lacquer gun, shortly after stirring was interrupted. A multi-color film was obtained, similar to that attained by brushing, but with more random pattern. The appearance of the pattern could be varied considerably by variations in such factors as wet film thickness and temperature of application.

The effects obtained in this example are associated with the relative instability of the dispersion, allowing some degree of coalescence of particles, which permits formation of a pattern of visible size.

In this example both polyvinyl alcohol and protein serve as coating binders, and also as insolubilizing resins for the materials of the other, complementary phase.

EXAMPLE X.—MULTI-COLOR METHYL CELLULOSE COATING COMPOSITION EMPLOYING A WATER-SOLUBLE RESIN AS AN IMMISCIBLE INSOLUBILIZING AGENT AND CLEAR BINDER

Composition A.—Dispersing medium

| | Parts by wt. |
|---|---|
| Water-soluble resin solution (Arolon 304, Archer-Daniels-Midland Co.) | 94.75 |
| Aqueous drier, manganese, 6% | 0.50 |
| 5% tannic acid, aqueous solution | 4.75 |
| Total | 100 |

26

Composition B.—White methyl cellulose base

| | Parts by wt. |
|---|---|
| 2% methyl cellulose, aqueous solution (15,000 cps.) | 99 |
| Titanium dioxide (R–900, Du Pont) | 1 |
| Total | 100 |

Composition C.—Red methyl cellulose base

| | Parts by wt. |
|---|---|
| 2% methyl cellulose, aqueous solution (15,000 cps.) | 99 |
| Red oxide pigment | 1 |
| Total | 100 |

Composition D.—White methyl cellulose dispersion

| | Parts by wt. |
|---|---|
| Composition A | 28.6 |
| Composition B | 57.2 |

Composition B was added to composition A, and the mixture stirred with moderate agitation until the desired average particle size was attained. Then addition was made of:

| | |
|---|---|
| 2% magnesium montmorillonite clay dispersion in water | 14.2 |
| Total | 100 |

After this addition, stirring was continued for a short while to give a uniform dispersion.

Composition E.—Red methyl cellulose dispersion

This was prepared in the same manner as composition D, except that composition C was used in place of composition B.

Composition F.—Multi-color white-red methyl cellulose-water-soluble resin coating Equal parts of compositions D and E were intermixed, and stirred until a uniform dispersion was obtained.

Composition F was sprayed onto cardboard with a standard lacquer gun. The white and red particles were easily seen by the naked eye after the coating film had hardened in place.

This illustration is analogous to Example I, but in this case Arolon 304 was used as an insolubilizing resin. Sodium pentachlorophenol was then not required as an insolubilizing agent in the dispersing phase, nor was clay required as an insolubilizing agent in the dispersed particles. By using an insolubilizing resin which forms a solution that is relatively immiscible with the dispersed particles, the dispersion was stabilized with dispersed particles of greater fluidity than could otherwise have been used. As a result, the coating composition of this example could be sprayed more readily than that of Example 1.

EXAMPLE XI.—MULTI-COLOR CERAMIC COATING COMPOSITION

This example illustrates the aggregate principle employing the formation of dispersions in which the dispersed globules comprise slurries of microscopic particles of ceramic frit or other fusible ceramic materials. When these larger globules are differently colored and sufficiently large to be visible, the dispersions are applicable to the production of multi-colored ceramic glazes upon firing of objects coated with them.

Composition A.—Pink ceramic glaze coat slurry

| | Parts by wt. |
|---|---|
| Water | 50 |
| Clay | 5 |
| Frit | 41 |
| Pink stain | 4 |
| Total | 100 |

Composition B.—Pink ceramic dispersion

| | Parts by wt. |
|---|---|
| Composition A | 24 |
| 2% sodium carboxymethyl cellulose (high viscosity grade) solution in water | 24 |

After mixing these components, through stirring was employed during the gradual addition of:

| | |
|---|---|
| 2% aluminum sulfate ($Al_2(SO_4)_3 \cdot 18H_2O$) solution | 8 | which resulted in formation of a soft gel. A single addition was then made of:

| | |
|---|---|
| 2% aluminum sulfate solution | 20 | and the gel was dispersed in this solution with slow stirring, continued until the desired average particle size was attained. The pH of the outer phase was raised to about 8 by the addition of ammonium hydroxide:

| | |
|---|---|
| 10% aqueous ammonium solution | about 0.5 | and the dispersion allowed to set about 10 minutes with occasional stirring, during which time the dispersed particles enlarged through swelling. The dispersion was then stabilized by the addition of:

| | |
|---|---|
| 2% aluminum sulfate solution | 4.0 |
| Water | 19.5 |
| Total | 100 |

The pH of the outer phase was then about 6.

Composition C.—Green ceramic dispersion

This was prepared in the same manner as composition B, but with the substitution of 2 parts or green stain for 2 parts of composition A.

Composition D.—Multi-color green-pink ceramic dispersion 33 parts of composition B were intermixed with 67 parts of composition C, and the mixture stirred until uniform dispersion was attained. The pink and green particles were easily distinguishable from one another on viewing with the naked eye.

In this example the carboxymethyl cellulose was the hydrophilic colloid, and aluminum sulfate was the insolubilizing agent. Ceramic frit was the inorganic binder, to be activated upon fusion of the ceramic coating.

EXAMPLE XII.— USE OF AQUEOUS DISPERSIONS FOR DRY PAINT PRODUCTION, WITH SUBSEQUENT REGENERATION OR RECONSTRUCTION

Composition A.—Aqueous soya protein solution

| | Parts by wt. |
|---|---|
| Soybean protein (alpha protein-medium viscosity) | 10 |
| 10% aqueous ammonia solution | 3 |
| 5% aqueous sodium pentachlorophenol solution | 1 |
| Water | 86 |
| Total | 100 |

Composition B.—Solution of styrene-maleic anhydride resin

| | Parts by wt. |
|---|---|
| Styrene-maleic anhydride polymer (Vinylite SYHM) (high viscosity grade) | 4.9 |
| 10% aqueous ammonia solution | 5.9 |
| Water | 89.2 |
| Total | 100 |

In compositions A and B the solutions were prepared in the conventional manner.

Composition C.—Granulated blue polyvinyl acetate latex

| | Parts by wt. |
|---|---|
| Polyvinyl acetate latex (55% solids-Gelva TS–66) | 21.7 |
| 45% hydrated aluminum silicate clay dispersion in 0.1% trisodium phosphate solution | 6.5 |
| 45% cobalt blue pigment dispersion in 0.4% trisodium phosphate solution | 6.5 |
| 55% titanium dioxide pigment dispersion in 0.5% trisodium phosphate solution | 10.9 |

These ingredients were thoroughly mixed before adding with mixing after each addition:

| | |
|---|---|
| Composition A | 10.9 |
| Composition B | 21.7 |
| Water | 21.8 |
| Total | 100 |

The resulting composite was then poured slowly into about 300 parts of a 0.25% aqueous solution of calcium chloride, with moderate agitation, giving a dispersion of filament-type particles. After addition was complete, sufficient calcium chloride was added to comprise a 10% solution in the outer or dispersing phase, and stirring continued for 15 minutes. The particles were then allowed to settle, and after pouring off the liquid phase, were washed twice with fresh water, then dried at 100° F., with occasional stirring. This gave particles of variable length up to about ½ inch, but principally on order of 1–10 mm. Particle size is affected by such things as viscosity of the dispersion base, initial concentration of the calcium chloride dispersing medium, amount of agitation during dispersion, amount of stirring during and after drying.

Composition D.—Granulated white polyvinyl acetate latex

The dispersion base was the same as in Composition C, but eliminating cobalt blue pigment dispersion, and using 16.3 parts of titanium dioxide pigment dispersion instead of 10.9 parts. The mixture was then poured into about 450 parts of 0.35% aqueous calcium chloride solution, with moderate agitation. The calcium chloride concentration was then increased to 10%, the dispersion stirred slowly for 15 minutes, and the particles washed and dried as in composition C. In this composition, the dry particles ranged principally between 0.2 and 2 mm. in length.

Composition E.—Regenerated one-color white latex coating composition

| | Parts by wt. |
|---|---|
| Composition D | 20 |
| 2% aqueous diammonium phosphate solution | 60 |
| Water | 20 |
| Total | 100 |

On mixing with the phosphate solution, the dry particles swelled and softened, and on stirring broke down into small particles, so that the mixture could be brushed easily in the manner of ordinary latex paints. This composition is an example of a conventional paint produced from dry composite granules. The extent of granule breakdown is related to the pH of the dispersion medium. In this case the final pH was on the order of 6–7.

Composition F.—Regenerated blue polyvinyl acetate latex dispersion

| | Parts by wt. |
|---|---|
| Composition C | 18 |
| 2% aqueous monoammonium phosphate solution | 55 |
| Water | 27 |
| Total | 100 |

On mixing with the phosphate solution, the dry particles swelled and softened, but without extensive breakdown or intermixing as in the case of composition E. The final pH of the dispersion medium in this case was on the order of 5–6. The object here was to produce macro-size particles for use in a multi-color dispersion. After forming the dispersion, final particle size was related to the degree of agitation, as in other examples of this invention.

Composition G.—Regenerated white polyvinyl acetate latex dispersion

Same as composition F, but using composition D in place of composition C.

Composition H.—Regenerated multi-color polyvinyl acetate latex coating composition

| | Parts by wt. |
|---|---|
| Composition F | 40 |
| Composition G | 40 |
| Water | 20 |
| Total | 100 |

The mixture of the ingredients was stirred to obtain a uniform dispersion, then sprayed onto cardboard with a standard lacquer gun. The deposited particles were small but clearly distinguishable from one another by the naked eye after the coating film had hardened in place. While in this case each color was regenerated before intermixing, similar examples indicate that they may also be mixed in the dry state, and regenerated simultaneously.

In this example the polyvinyl acetate latex is the primary film-forming resin. Soybean protein and the styrene-maleic anhydride polymer are the hydrophilic colloids, and calcium chloride is the insolubilizing agent.

EXAMPLE XIII.—MULTI-COLOR ACRYLIC LATEX COATING COMPOSITION

Composition A.—White acrylic latex base

| | Parts by wt. |
|---|---|
| Titanium dioxide | 12.8 |
| Calcium carbonate | 12.8 |
| 0.75% polyvinyl alcohol solution in water (Elvanol EP 55–1500) | 11.4 |
| 3% guar gum (high viscosity grade) aqueous dispersion | 17.0 |
| Acrylic latex, 46% solids (Rhoplex AC–34) | 29.5 |
| 0.125% ammonium tetraborate solution in water | 16.5 |
| Total | 100 |

This composition was prepared by first dispersing pigment and filler in the polyvinyl alcohol solution. The guar gum was then added as a partly dissolved aqueous dispersion, and blended with good stirring. The guar gum dissolved upon further stirring with addition of the acrylic latex. After complete mixture of these components, the ammonium tetraborate solution was added with good stirring to convert the coating composition to a homogeneous, semi-fluid gel.

Composition B.—Red acrylic latex base

| | Parts by wt. |
|---|---|
| Titanium dioxide | 4.0 |
| Red iron oxide pigment | 7.9 |
| Calcium carbonate | 11.9 |
| 0.5% polyvinyl alcohol solution in water | 15.9 |
| 3% guar gum (high viscosity grade) aqueous dispersion | 15.9 |
| Acrylic latex, 46% solids (Rhoplex AC–34) | 27.8 |
| 0.0625% ammonium tetraborate solution in water | 16.6 |
| Total | 100 |

This is analogous to composition A, using a small particle size red iron oxide pigment for a portion of titanium dioxide. Because of the thickening effect of this pigment, more water and less ammonium tetraborate were used to obtain the desired viscosity.

Composition C.—Dispersing medium

| | Parts by wt. |
|---|---|
| 2% sodium carboxymethylcellulose (high viscosity grade) solution in water | 5.0 |
| 2% magnesium montmorillonite clay aqueous dispersion | 5.0 |
| 10% attapulgus clay (hydrous magnesium aluminum silicate) aqueous dispersion | 5.0 |
| 2% hydroxyethyl cellulose (high viscosity grade) solution in water | 10.0 |
| 10% sodium tripolyphosphate solution in water | 1.0 |
| 5% ammonium tetraborate solution in water | 7.0 |
| Water | 67.0 |
| Total | 100 |

This composition was prepared by thoroughly blending the first two components, then adding the others with stirring in the normal manner.

Composition D.—Thickening mixture

| | Parts by wt. |
|---|---|
| 2% sodium carboxymethylcellulose (high viscosity grade) solution in water | 33.3 |
| 2% magnesium montmorillonite clay aqueous dispersion | 33.3 |
| 5% ammonium tetraborate solution in water | 10.0 |
| Water | 23.4 |
| Total | 100 |

Composition E.—White acrylic latex dispersion 67 parts of composition A were added to and dispersed in 28 parts of composition C. After moderate stirring to give the desired particle size, 5 parts of composition D were added.

Composition F.—Red acrylic latex dispersion

This was prepared in the same manner as composition E, but using composition B instead of composition A.

Composition G.—Multi-color white-red acrylic latex coating

Equal parts of compositions E and F were intermixed, and stirred until uniform dispersion was obtained.

Composition G was sprayed onto cardboard with a standard lacquer gun. The white and red particles were easily seen by the naked eye after the coating film had hardened in place.

In this example acrylic latex was the primary film-former, with guar gum and polyvinyl alcohol serving as hydrophilic colloids. The polyvinyl alcohol was employed in addition to guar gum because it is affected by the same insolubilizing agents, and is effective as a pigment dispersant. The insolubilizing agents were magnesium montmorillonite clay, attapulgus clay, ammonium tetraborate and sodium tripolyphosphate. Sodium carboxymethylcellulose and hydroxyethyl cellulose acted as thixotropic thickeners.

EXAMPLE XIV.—MULTI-COLOR CERAMIC COATING COMPOSITION

The starting ceramic materials used in this example were typical commerical tile glazes which had the composition shown below.

YELLOW AND BLUE CERAMIC GLAZES

| | Parts by weight | |
|---|---|---|
| | Composition A | Composition B |
| Ceramic frit | 50.6 | 51.7 |
| Clay | 4.4 | 4.4 |
| Zirconium silicate | 3.8 | 3.8 |
| Yellow ceramic stain | 3.8 | |
| Blue ceramic stain | | 1.9 |
| Water | 37.4 | 38.2 |
| Total | 100 | 100 |

Composition C.—Yellow ceramic glaze gel for dispersed phase

| | Parts by wt. |
|---|---|
| Composition A | 39.0 |
| 1% acetic acid solution in water | 5.3 |
| 1% guar gum (high viscosity grade) solution in water | 55.7 |
| Total | 100 |

This composition C was prepared by modifying the pH with acetic acid addition, then stirring in the guar gum solution to yield a homogeneous, semi-fluid gel.

Composition D.—Dispersing medium containing blue ceramic glaze

| | Parts by wt. |
|---|---|
| Composition B | 62.5 |
| 2% sodium carboxymethyl cellulose solution in water | 12.5 |
| 2% magnesium montmorillonite clay, aqueous dispersion | 12.5 |
| Water | 12.5 |
| Total | 100 |

The sodium carboxymethylcellulose and clay were thoroughly blended together, then added with stirring to the ceramic glaze of Composition B.

Composition E.—Multi-color yellow-blue ceramic dispersion 55 parts of composition C were dispersed in 45 parts of composition D, and the mixture was stirred with moderate agitation until the desired average particle size was obtained. After spraying composition E onto a ceramic bisque and firing at approximately 1900° F., a smooth, glossy ceramic multi-color glaze was obtained, in which individual blue and yellow areas were easily distinguishable by the naked eye.

In this example the hydrophilic colloid was guar gum, which is gelled by water soluble salts, such as alkaline borates, that are commonly present in ceramic glazes. These are substantially inactive, however, in acid media. In order to permit mixing of the ceramic coating with the guar gum, it was therefore necessary to adjust the pH with acid to prevent excessive insolubilization before addition of the dispersed phase to the dispersing medium. The insolubilizing agents include magnesium montmorillonite clay as well as the water soluble salts provided by the ceramic glaze. The sodium carboxymethylcellulose acted as a thixotropic suspending aid. The ceramic glaze coating constituted the primary film-forming material, which was activated by fusion after burning out the guar gum.

The aqueous coating compositions of the present invention provide a number of unique advantages. Because of the extreme availability and economy of water the compositions are inexpensive to produce. They are also easily produced with a minimum of equipment and materials.

Multiple dispersions of two or more dispersed phases in a dispersing medium provide coating compositions of different colors or shades which not only give coatings of a unique appearance and capable of almost endless variation in respect to combinations of colors, textures, particle size and shapes and thickness, but also provide excellent covering power on rough unprepared and porous surfaces.

Because of the low penetration of the coating compositions of the present invention on even porous surfaces these compositions are well adapted for application to dissimilar adjacent surfaces to conceal the dissimilarities. For example, a single coat of a coating composition in accordance with the present invention applied to adjacent surfaces of different types such as wood, plastic, plaster, paper and metal produces a coating of uniform appearance on the several different surfaces. Matching of colors is made easier employing the multi-color aqueous coating compositions of the present invention. In general practice, the exact matching of colors between one batch and another is often a difficult and time-consuming procedure. When using the multi-color coating compositions of this invention, the problem is simplified because less exact matches are required, the overall effect being relatively unchanged by any slight errors in tone which the individual colors may display when viewed independently as single colors.

The terms and expressions employed are used as terms of description and not of limitation, and it is not intended, in the use of such terms and expressions, to exclude any equivalents of the features shown and described or portions thereof, but it is recognized that various modifications are possible within the scope of the invention claimed.

What is claimed is:

1. A substantially odor-free liquid composition for imparting a decorative coating to a desired surface, which composition consists essentially of:
   (a) a first flowable colored phase comprising an aqueous hydrophilic colloid film-former;
   (b) a second flowable aqueous phase of a color different from that of said first phase and substantially immiscible therewith in the presence of
   (c) an insolubilizing agent for said hydrophilic colloid initially present as such in at least one of said phases, and in such quantity as to render said first flowable colored phase and said second flowable aqueous phase substantially insoluble in one another, wherein said composition when applied to said desired surface provides a decorative coating thereon that is defined by a plurality of spaced, visibly distinct areas of different appearance of said first and second phases.

2. A composition as defined in claim 1 which further includes an aqueous water-thinnable film-former in said second phase.

3. A composition as defined in claim 1 wherein said insolubilizing agent comprises a silicious material selected from the group consisting of colloidal silica and colloidal silicates.

4. A composition as defined in claim 1 which further includes a second water-thinnable film-former in said first flowable colored phase.

5. A composition as defined in claim 1 wherein said first flowable colored phase comprises discrete globules having a plurality of colors different from the color of said second aqueous phase.

6. A composition as defined in claim 4 wherein said second water-thinnable film-former is rendered substantially water-insoluble in said second flowable aqueous phase by its state of intimate intermingling with said hydrophilic colloid film former, with said second water-thinnable film former alone not being substantially insolubilized by said insolubilizing agent.

7. A composition as defined in claim 1 wherein said hydrophilic colloid is an organic macro-molecular polymer of relatively high molecular weight characterized by forming heavy-bodied solutions at concentrations of no more than about 5 to 10 percent by weight, the particle shape of which hydrophilic colloid in solution is predominantly that of linear rather than spherocolloids.

8. A composition as defined in claim 4 wherein said water-thinnable film-former is selected from a group consisting of organic resin latices and emulsions, water-dispersible oils, and water-reducible solutions of natural and synthetic polymers and natural polymer derivatives.

9. A composition as defined in claim 4 for imparting a fire-resistant decorative coating to a desired surface wherein said water-thinnable film-former is selected from a group consisting of water soluble alkali silicates, water-dispersible ceramic frits and non-fritted ceramic minerals.

10. A composition as defined in claim 9 wherein said decorative coating is in the form of a glaze when said first and second phases are applied to said surface and subsequently fired at an elevated temperature.

11. A composition as defined in claim 1 which further includes a particled water-insoluble filler material in at least one of said phases, which filler material is selected from the group consisting of sand, clay, glass beads, glass fibers, metallic fibers, metallic flakes, metallic powders, cellulose fibers and asbestos fibers.

12. A method of preparing an aqueous, substantially odor-free, multi-color coating composition which consists essentially of a dispersion of discrete semi-fluid to gelatinous globules of an aqueous film-former in an aqueous dispersion medium, which globules comprise a hydrophilic colloid film-former, with at least a substantial number of said globules being at least 25 microns in size, and with at least some of the discrete dispersed globules being colored and different in color from said dispersing medium, which method comprises:
   (a) adding one to another an aqueous flowable hydrophilic colloid film-former containing a colorant and an aqueous flowable dispersing medium containing an insolubilizing agent for said hydrophilic colloid film former; and
   (b) agitating said mixed film-former, colorant, dispersing medium an dinsolubilizing agent to produce a dispersion of said discrete globules in said dispersing medium, wherein said colorant remains substantially in said globules without coloring said aqueous dispersing medium, which insolubilizing agent is present in such quantity as to render said hydrophilic colloid film-former substantially insoluble in said aqueous flowable dispersing medium.

13. A dry granular material capable of being reconstituted by the addition of an aqueous medium to provide an aqueous, substantially odor-free multi-color coating composition, which material is produced by drying a composition as defined in claim 1.

14. A method as defined in claim 12 which includes the further step of mixing a water-thinable film-former with said hydropholic colloid film-former prior to comingling said hydrophilic colloid film-former with said aqueous flowable dispersing medium containing an insolubilizing agent, with said water-thinnable film-former being selected from the group consisting of organic resin latices and emulsions, water-dispersible oils, water-reducible solutions of natural and synthetic polymers and natural polymer derivatives, water-soluble alkali silicates, water-dispersible ceramic frits and non-fritted ceramic minerals.

15. A method as defined in claim 12 wherein said insolubilizing agent is selected from the group consisting of hydrophilic colloids and water soluble salts, acids and alkalies.

16. A method as defined in claim 12 which further includes the step of preparing a plurality of portions of said aqueous flowable hydrophilic colloid film-former and colorant, with each of said portions being of a color different from that of the balance of said portions, and adding said portions one to the other to said aqueous flowable dispersion medium containing said insolubilizing agent.

17. A method as defined in claim 12 which includes the further step of mixing an insolubilizing agent for said hydrophilic colloid film-former with said film-former prior to the addition of said film-former to said aqueous flowable dispersing medium, and with the quantity of said insolubilizing agent added to said film-former being such as to substantially increase the viscosity thereof, but insufficient in quantity as to render said film-former substantially immiscible with said aqueous flowable phase, which film-former after being added to said aqueous flowable phase is rendered immiscible therein by said insolubilizing agent contained in said aqueous flowable phase.

18. A method as defined in claim 12 which further includes the step of heating said hydrophilic colloid film-former and colorant to form a gel before mixing with said aqueous flowable dispersing medium.

19. A composition as defined in claim 1 wherein said first flowable colored phase is in the form of a plurality of discrete globules that are of a plurality of different colors.

20. A composition as defined in claim 19 wherein said second flowable aqueous phase is substantially colorless and transparent, and said distinct areas are defined by said globules.

21. A composition as defined in claim 1 wherein said first flowable colored phase is in the form of a plurality of discrete globules of a first color and said second flowable aqueous phase is of a second color different from that of said first color, and said distinct areas are defined by said first and second flowable phases.

22. A composition as defined in claim 1 wherein both said first and second phases contain an insolubilizing agent, but with the quantity of insolubilizing agent in said first phase alone being insufficient to render said phases substantially insoluble in one another.

References Cited

UNITED STATES PATENTS

| 2,228,158 | 1/1941 | Teale | 252—311 |
| 2,591,904 | 4/1952 | Zola | 106—170 |
| 3,077,468 | 2/1963 | Guerdon | 260—232 |

ALLAN LIEBERMAN, Primary Examiner

U.S. Cl. X.R.

106—48, 74, 81, 84, 158, 170, 207, 208, 213, 287; 260—8, 13, 17, 17.4, 18, 23, 24, 29.2, 29.6